United States Patent Office 3,102,130
Patented Aug. 27, 1963

3,102,130
PREPARATION OF PHOSPHOROTHIOATE ESTERS FROM BENZYL ALCOHOL AND PHOSPHORUS PENTASULFIDE
Allen F. Millikan, Crystal Lake, and Gifford W. Crosby, River Forest, Ill., assignors to The Pure Oil Company, Chicago, Ill., a corporation of Ohio
No Drawing. Filed Sept. 23, 1957, Ser. No. 685,390
4 Claims. (Cl. 260—461)

This invention relates to new and useful improvements in phosphorothioate ester compositions, to methods of making the same, and to improved lubricant compositions containing a small amount of the esters sufficient to enhance the antiwear properties thereof.

In particular, this invention is based upon the discovery that the reaction of benzyl alcohol with phosphorus pentasulfide, in a mol ratio in excess of about 4/1, at temperatures of 20°–130° C. produces a mixture of reaction products which, when allowed to settle, separates into two phases. The upper phase is recovered and is found to be an oil-soluble, complex, phosphorothioate ester having sulfur-to-phosphorus ratios in the range of 3.0 to 10/1 and an acid equivalent per atom of phosphorus pentasulfide, followed by settling and recovery of upon the discovery that the incorporation of small amounts of the complex phosphorothioate ester composition, produced by reaction of benzyl alcohol and phosphorus penta sulfide, followed by settling and recovery of the upper, oil-soluble phase, in a lubricating oil produces a lubricant composition of exceptional and unexpected antiwear properties.

Diesters of phosphorodithioic acids are commonly prepared by reacting an alcohol or phenol with phosphorus pentasulfide in a 4/1 mol ratio. Products of this reaction may be represented by the formula: $(RO)_2P(S)SH$, where R may be alkyl, aryl, alkylaryl or arylalkyl. In experimental work it was found that this reaction takes place as expected, when carried out with phenol, cresols, xylenols, naphthols, ethanol, n-butanol, isobutanol, pentanols, n-hexanols, cyclohexanol, 4-methyl-2-pentanol, octanol-2, 2-ethylhexanol, decanols, dodecanol-1, and hexadecanol. In all of these experiments, the yield of phosphorodithioic acid diester was 90–100%, as measured by acid number, when primary alcohols were used. The products of these reactions, however, were in all cases diesters of phosphorodithioic acid, containing sulfur to phosphorus in a ratio of 2 to 1 and containing 1 acid equivalent per atom of phosphorus. These compounds because of their high acidity and relatively low sulfur-to-phosphorus ratio are generally unsatisfactory as lubricating oil additives.

It is therefore one object of this invention to provide a new and improved phosphorothioate ester composition which is substantially neutral and contains a high sulfur-to-phosphorus ratio.

Another object of this invention is to provide a new and improved method for preparing phosphorothioate esters of high sulfur-to-phosphorus ratio.

A further object of this invention is to provide an improved lubricating oil composition having superior antiwear properties.

A feature of this invention is the provision of a new phosphorothioate ester composition having a sulfur-to-phosphorus ratio in the range of 3.0 to 10/1 and substantially neutral, produced by reaction of benzyl alcohol and phosphorus pentasulfide.

Another feature of this invention is the provision of a process for preparation of phosphorothioate esters of high sulfur-to-phosphorus ratios in which benzyl alcohol and phosphorus pentasulfide are reacted and allowed to settle, and a lighter, oil-soluble phase recovered which is substantially neutral and has a high sulfur-to-phosphorus ratio.

A further feature of this invention is the provision of an improved lubricating oil composition containing a small amount of a phosphorothioate ester composition produced by reaction of benzyl alcohol and phosphorus pentasulfide and having a high sulfur-to-phosphorus ratio, said ester composition being present in an amount sufficient to enhance substantially the antiwear properties of the lubricant.

Other objects and features of this invention will become apparent from time to time throughout the specification and claims as hereinafter related.

This invention is based upon the discovery that, while substantially all alcohols and phenols react with phosphors pentasulfide in a uniform and predictable manner to produce dialkyl or diaryl esters of phosphorodithioic acid, the reaction of benzyl alcohol and phosphorus pentasulfide is anomalous. We have found that when benzyl alcohol and phosphorus pentasulfide are reacted in a 4/1 mol ratio, an exothermic reaction takes place which produces a two-phase product. When the product is allowed to settle, the two phases separate into distinct layers, and the upper or lighter phase is recovered as a phosphorothioate ester composition having unusual properties. The upper phase of the product which is recovered has a high sulfur-to-phosphorus ratio, in the range from 3.0 to 10/1, and a very low acidity, less than 0.5 acid equivalent per atom of phosphorus. The lower phase has been found to have approximately two acid equivalents per atom of phosphorus and only a very small percent of the sulfur charged, having a sulfur-to-phosphorus ratio of the order of 0.25 or less. This invention is further based upon the discovery that the sulfur-rich phase of this reaction product, when incorporated in a lubricating oil, enhances the antiwear properties of a lubricating oil to an unexpected and unpredictable degree. The invention will be more fully illustrated by the following specific examples:

EXAMPLE I

A reaction flask, equipped with a stirrer and thermometer, and supported over a steam bath, was charged with 216 g. (2.0 gram moles) of benzyl alcohol, 111 g. (0.5 gram mol) of phosphorus pentasulfide, 216 g. of 85 vis./100 V.I. neutral oil, and 260 ml. of toluene. The reaction mixture was heated to 90° C. and stirred for one hour, at which time a vigorous exothermic reaction began. Even though the steam bath was removed, the temperature of the reaction mixture rose to 125° C. and remained there for 15 minutes. After the evolution of heat had ceased, steam heating and stirring were resumed and continued for another 15 minutes after which the mixture was allowed to cool. An appreciable amount of solid material was precipitated as a result of the reaction.

Supernatant liquid was removed from the mixture and the solid material was extracted by stirring with 200 ml. of a 50/50 ethanol/tolene mixture. All of the liquids were then composited and mixed with an additional 200 ml. of tolene, after which the resulting liquid was stripped with nitrogen, under vacuum, to remove ethanol and toluene. The stripped residue separated into two phases, the upper phase having relatively low acidity and the lower phase having relatively high acidity. The upper phase weighed 550 g., and contained 2.5 wt. percent phosphorus and 9.5 wt. percent sulfur. The phosphorus in this phase mounted to about 45% of the phosphorus initially charged as phosphorus pentasulfide. The sulfur/phosphorus atomic ratio in this phase was 3.7/1, while that of the expected dibenzyl phosphorodithioic acid would have been only 2/1. Acidity of this phase mounted to 0.5 equivalent per phosphorus atom, whereas the acidity of the expected dibenzyl phosphorodithioic acid would have been 1 equivalent per phosphorus atom. The lower phase, on the other hand, had an acid equivalent of almost 2 per phosphorus atom and a sulfur content amounting to less than 10% of the charged sulfur.

As previously pointed out, this reaction is completely anomalous and cannot be satisfactorily explained due to the complexity of the reaction products. One possible explanation for this reaction, which would account for the distribution of acid values, is that dibenzyl phosphorodithioic acid is formed as an intermediate and disproportionates into a tetrathioate ester, or polymer thereof, which is the recovered upper oil-soluble layer, and benzyl dihydrogen phosphate is the lower water-soluble layer. This theory of the reaction, however, has not been proved since the products are of a somewhat polymeric nature and could not be identified as specific compounds. The oil-soluble, sulfur-containing phase is therefore referred to as a phosphorothioate ester which is substantially neutral and has a high sulfur-to-phosphorus atomic ratio, in the range from 3.0 to 10/1.

EXAMPLE II

In another experiment, benzyl alcohol and phosphorus pentasulfide were reacted over a steam bath in a mol ratio of 6/1, in the same manner described in Example I. The resulting oil-soluble product was isolated as an upper liquid phase in the same manner as previously described and was found to contain sulfur and phosphorus in an atomic ratio of 4.0/1 and had an acidity of only 0.1 equivalent per phosphorus atom.

EXAMPLE III

In still another experiment, 3.0 moles of benzyl alcohol were added to a stirred, boiling mixture of benzene, mineral oil, and 0.5 mole of phosphorus pentasulfide. During the addition period of one hour and for one additional hour of reaction time, benzene was allowed to distill off slowly. The product which was recovered after stripping off the diluent liquid had a composition corresponding to dibenzyl phosphorodithioic acid in mineral oil solution. This material was held at 25° to 30° C. for a period of three months and separated into two phases. The upper phase was an oily liquid, soluble in oil, and had a sulfur-phosphorus atomic ratio of about 3.2/1. This phase represented 88.5% by weight of the total reaction product, contained 55% by weight of the phosphorus charged and 91% by weight of the sulfur charged, and had an acid equivalent of 0.4. An analysis of the lower phase showed that the total acidity of both phases represented 100% of the charged acidity, thus indicating that the reaction is a disproportionation, rather than an hydrolysis by extraneous moisture.

EXAMPLE IV

Benzyl alcohol and phosphorus pentasulfide, in a 6/1 mol ratio, were reacted in the manner described in Example III, to produce a composition having an analysis corresponding roughly to dibenzyl phosphorodithioic acid. This reaction product (or mixture of reaction products) was heated at 80° C. for periods of 5 hours, 15 hours, and 72 hours, respectively. When this reaction product was heated, it was found to divide into two phases as previously described. The upper phase was recovered as an oily, oil-soluble product having very low acidity and a high sulfur-to-phosphorus ratio. The product obtained after heating for 5 hours had an acid equivalent per atom of phosphorus of 0.2, and a sulfur-to-phosphorus atomic ratio of 3.6. The product obtained after 15 hours had an acid equivalent per atom of phosphorus of 0.1 and a sulfur-to-phosphorus atomic ratio of 4.0. The product obtained after 72 hours had a sulfur/phosphorus atomic ratio of 9.2. These data indicate that the initial reaction of benzyl alcohol and phosphorus pentasulfide produces an intermediate reaction product which disproportionates to an oxygen-containing acid and a neutral polymeric ester of phosphorotetrathioic acid. This ester is apparently complex and contains some polymerization products which makes separation of a pure compound difficult, if not impossible. At elevated temperatures the phosphorotetrathioate ester composition apparently disproportionates further and eliminates a further acid phase in the form of a condensed acid, or an ester of a condensed acid, leaving a sulfur-rich phase which apparently is a phosphorothioate ester composition containing some polysulfide linkages or possibly containing separate polysulfide compounds in admixture therewith.

EXAMPLE V

In still another experiment, 3 moles of benzyl alcohol were added to 0.5 mol of phosphorus pentasulfide in 350 ml. of toluene at 90° C. over a period of 3.5 hours. After an additional 1.5 hours at the same temperature, the product was stripped of solvent under vacuum and the residue found to settle into two liquid phases. The two liquid phases were separated, the upper phase being a substantially neutral, oily, oil-soluble liquid, and the lower phase being a syrupy acid. The upper phase consisted of 307 g. of oily liquid, containing 3.9% phosphorus by weight, representing 39% of the phosphorus charged. This liquid contained 77% of the sulfur charged, had a sulfur-phosphorus atomic ratio of 4.0/1, and an acid equivalent per atom of phosphorus of 0.1. The lower phase was a syrupy liquid and weighed 96 g. This liquid contained 23.0% phosphorus by weight, which represented 61% of the charged phosphorus. The sulfur/phosphorus atomic ratio in this liquid was only 0.1, representing 4% of the charged sulfur, and had an acid equivalent per atom of phosphorus of 1.8.

Our experiments indicate that when benzyl alcohol and phosphorus pentasulfide are reacted in a mol ratio not less than about 4 to 1, at a temperature of 20°–130° C. there is produced a mixture of reaction products which settle into two liquid phases. The upper phase is recovered as an oily phosphorothioate ester, of uncertain molecular composition, which is soluble in oil, has a sulfur-to-phosphorus atomic ratio in the range of 3.0–10/1 (depending upon the temperature of the reaction), and an acid equivalent per atom of phosphorus of less than 0.5. The preferred reaction conditions for producing these ester compositions require a benzyl alcohol/phosphorus pentasulfide mol ratio of 4–6/1, at a temperature of 80°–125° C. for a period of 1 to 5 hours. The product, under these conditions, is a substantially neutral, oil-soluble ester composition having a sulfur/phosphorus atomic ratio of about 4/1.

The phosphorothioate ester compositions which are produced by this process have been found to have unexpectedly superior properties when used as antiwear additives for lubricating oil compositions. These ester compositions (the neutral oily phase of the reaction product), when added to lubricating oils to produce a phosphorus concentration in the oil in the range of 0.005–1.0%, have been found to reduce wear of moving parts lubricated therewith to an unexpected degree. To demonstrate the superiority of lubricating compositions including small amounts of the product of this process, a number of lubricant compositions were prepared using a mineral lubricating oil base and various additives to demonstrate the antiwear properties thereof. These oil compositions were tested in the Shell four-ball E.P. test apparatus under a 20 kg. load, at 1800 r.p.m., for 5 minutes at room temperature. Under these conditions of load, the balls are elastically deformed at point of contact to produce a circular area of contact, between each of the balls, having a diameter of 0.236 mm. The measure of resistance of an oil to wear (i.e., the antiwear properties thereof) is the ability of the oil to prevent formation of a wear scar having a diameter greater than the initial diameter of the circular area of contact or elastic indentation. To illustrate the significance of this wear test, a solvent-refined 170 vis., 100 V.I. neutral oil was used to lubricate the balls in the four-ball test apparatus. At the end of the test period, under the conditions above-described, the balls were found to have circular scars which were 0.376 mm. in diameter. These scars were enlarged by 0.140 mm. in diameter over the diameter of elastic indentation, an increase of more than 50% in scar diameter. In evaluating the performance of antiwear additives in lubricating oils, various oil compositions are measured in the four-ball test apparatus and the size of the wear scars compared. Since the wear scar can never be smaller in diameter than the elastic indentation, the comparison of wear using different lubricants is best made by measuring the increase in scar diameter over the diameter of elastic indentation. Oils which have superior antiwear properties will, of course, produce scars having a smaller increase in diameter than oils which do not provide wear protection. A number of oil compositions were prepared and tested using a 170 vis. 100 V.I. neutral oil base, the results being reported in Table I as follows:

Table I

| Antiwear Additive | S/P Ratio in Additive | Percent P in Blend | Average increase in scar Diameter Over Diameter of Elastic Indentation, mm.×10³ |
|---|---|---|---|
| Phosphorothioate ester composition produced according to Example I | 3.7 | 0.11 | 40 |
|  |  | 0.05 | 40 |
| Phosphorothioate ester composition produced according to Example IV | 6.6 | 0.04 | 40 |
|  |  | 0.02 | 50 |
| Tribenzyl Phosphorotetrathioate | 4 | 0.10 | 110 |
|  |  | 0.05 | 80 |
| None | | | 140 |

In another series of experiments these antiwear additives were evaluated using a lubricating oil base containing a detergent and a V.I. improver, which are used in detergent-type lubricating oils and which impart some antiwear properties to such oils. In these tests, the lubricant base consisted of:

Wt. Percent
170/100 V.I. neutral oil _____ 83.1
Extract from phenol extraction of 85/100 V.I. neutral oil _____ 4.8
Barium phenol sufide-calcium sulfonate _____ 5.7
Acryloid 618 (acrylic polymer manufactured by Rohm & Haas, Inc.) _____ 6.4

This lubricating oil composition was evaluated for antiwear properties without any additives, and with various phosphorus- and sulfur-containing compounds added in concentrations such that 0.1 wt. percent phosphorus was contained in each blend. The testing of these compounds was conducted in a four-ball E.P. machine as in the other tests. The tests were carried out using a 20 kg. load, at 1800 r.p.m. for 5 minutes. As in the other experiments, the wear of the balls is expressed as the differences between the diameter of elastic indentation and the diameter of the circular scar produced during the test. The results of several tests are shown in Table II as follows:

Table II

| Additive (in an amount sufficient to produce phosphorus concentration of 0.1%) | Average increase in scar diameter over initial diameter of elastic indentation, mm.×10³ |
|---|---|
| None | 44 |
| O,O-Diamyl phosphorodithioic acid | 48 |
| 1-Phenylethyl O,O-diamyl phosphorodithioate | 53 |
| Benzyl O-O-diamyl phosphorodithioate | 33 |
| Commercial zinc dialkyl phosphorodithioate composition | 37 |
| Product of Example I (having S/P atomic ratio of 3.7) | 29 |

The above data show quite clearly that phosphorothioate ester compositions are not at all uniform or predictable in their ability to impart antiwear properties to lubricating oils. From the above table it is seen that two phosphorothioate esters actually decrease the antiwear properties of the detergent-type lubricating oil base, while two other esters made some improvement in antiwear properties. The products produced in the process of this invention enhance the antiwear properties of this detergent-type lubricating oil base to a much greater extent than any of the other additives.

While there have been described several specific embodiments of this invention, it should be understood that within the scope of the appended claims this invention may be practiced otherwise than as specifically described.

What is claimed is:

1. A method of preparing phosphorothioate ester compositions having a high sulfur-to-phosphorus ratio which comprises mixing benzyl alcohol and phosphorus pentasulfide in a mol ratio not less than about 4/1 at a temperature of 20–130° C. sufficient to induce reaction, said reaction being exothermic and being allowed to proceed until substantially complete, as evidenced by cessation of evolution of heat, then heating the reaction product to about 80° C. for at least 72 hours before settling, allowing the reaction products to settle into two liquid phases, and recovering the upper phase consisting of phosphorothioate esters, soluble in oil, having a sulfur-to-phosphorus atomic ratio in excess of 9/1 and an acid equivalent per atom of phosphorus of less than 0.5.

2. A method according to claim 1 in which the reaction is carried out in an inert solvent and the solvent is stripped from the reaction product.

3. A method according to claim 1 in which the reaction is carried out with a benzyl alcohol-phosphorus pentasulfide mol ratio of 6/1, for a period of 2 hours.

4. A method according to claim 2 in which the benzyl alcohol and phosphorus pentasulfide are reacted in a mol ratio of about 6/1 for 2 hours.

References Cited in the file of this patent
UNITED STATES PATENTS

| 2,242,260 | Prutton | May 20, 1941 |
| 2,396,719 | Musselman et al. | Mar. 19, 1946 |
| 2,424,402 | Loane et al. | July 22, 1947 |
| 2,442,915 | Berger | June 8, 1948 |
| 2,489,249 | Adelson | Nov. 29, 1949 |
| 2,537,926 | Andress | Jan. 9, 1951 |
| 2,593,496 | Smith et al. | Apr. 22, 1952 |

UNITED STATES PATENT OFFICE
CERTIFICATE OF CORRECTION

Patent No. 3,102,130  August 27, 1963

Allen F. Millikan et al.

It is hereby certified that error appears in the above numbered patent requiring correction and that the said Letters Patent should read as corrected below.

Column 1, line 25, strike out "phorus pentasulfide, followed by settling and recovery of" and insert instead -- phorus of less than 0.5. This invention is further based --; column 2, lines 16 and 17, for "phosphors" read -- phosphorus --; lines 60 and 62, for "tolene", each occurrence, read -- toluene --; same column 2, line 69, and column 3, line 1, for "mounted", each occurrence, read -- amounted --.

Signed and sealed this 3rd day of March 1964.

(SEAL)
Attest:

ERNEST W. SWIDER
Attesting Officer

EDWIN L. REYNOLDS
Acting Commissioner of Patents